(12) United States Patent
Kocic et al.

(10) Patent No.: US 12,507,068 B2
(45) Date of Patent: Dec. 23, 2025

(54) AUTOMATED MESSAGE ROUTING CHANGES BASED ON COMPLETION RATE

(71) Applicant: TeleSign Corporation, Marina del Rey, CA (US)

(72) Inventors: Jelena Kocic, Belgrade (RS); Aleksandar Grgic, Belgrade (RS)

(73) Assignee: Telesign Corporation, Marina del Ray, CA (US)

( * ) Notice: Subject to any disclaimer, the term of this patent is extended or adjusted under 35 U.S.C. 154(b) by 516 days.

(21) Appl. No.: 17/577,755

(22) Filed: Jan. 18, 2022

(65) Prior Publication Data

US 2023/0232223 A1    Jul. 20, 2023

(51) Int. Cl.
*H04W 12/06* (2021.01)
*H04W 40/12* (2009.01)
*H04W 48/18* (2009.01)

(52) U.S. Cl.
CPC ....... *H04W 12/068* (2021.01); *H04W 40/125* (2013.01); *H04W 48/18* (2013.01)

(58) Field of Classification Search
None
See application file for complete search history.

(56) References Cited

U.S. PATENT DOCUMENTS 10,958,673 B1   3/2021   Chen et al.
2006/0277259 A1*  12/2006  Murphy ................ H04L 51/212
                                                                 709/206
2007/0177773 A1*   8/2007  Hu ........................ G06F 18/28
                                                                 382/119
2018/0199383 A1*   7/2018  Au Yeung ............... H04L 67/55
2019/0313253 A1*  10/2019  Soulez ................ H04L 61/5007

(Continued)

FOREIGN PATENT DOCUMENTS

CN    112311770 A   *   2/2021
EP        3923524       12/2021
EP        3923524 A1 *  12/2021   ............. H04L 51/23

OTHER PUBLICATIONS

International Search Report and Written Opinion received for counterpart International Application No. PCT/US2023/060729 mailed May 9, 2023 (11 pages).

*Primary Examiner* — Fatoumata Traore
(74) *Attorney, Agent, or Firm* — Perkins Coie LLP

(57) ABSTRACT

Systems and methods for routing messages are disclosed herein. The methods can include maintaining, at a computing system, a plurality of completion rates, wherein each completion rate is associated with a communication network. The methods can also include receiving, from a service provider, a request to authenticate an end user of the service provider, generating an authentication message, and selecting, based on the maintained completion rates, a communication network from a plurality of communication networks. The methods can further include transmitting the authentication message to a device associated with the end user using the selected communication network, receiving an indication that the end user performed an action in response to receiving the authentication message, determining whether the end user has been authenticated based on the end user's action, and updating the maintained completion rate associated with the selected communication network based on the determination.

20 Claims, 6 Drawing Sheets

| | 510 Network | 515 Completion Rate | 520 Retry Rate | 525 Delivery Rate |
|---|---|---|---|---|
| 505a | Network 1 | 85% | 10% | 91% |
| 505b | Network 2 | 65% | 31% | 71% |
| 505c | Network 3 | 92% | 3% | 98% |

500 — Network Performance Metrics

(56) References Cited

U.S. PATENT DOCUMENTS

2020/0382485 A1\* 12/2020 Milton .................... G06F 21/43
2021/0344575 A1\* 11/2021 O'Shaughnessy ..........................
                                            H04L 41/0823

\* cited by examiner

500

| Network Performance Metrics | | | |
|---|---|---|---|
| 510 Network | 515 Completion Rate | 520 Retry Rate | 525 Delivery Rate |
| Network 1 | 85% | 10% | 91% |
| Network 2 | 65% | 31% | 71% |
| Network 3 | 92% | 3% | 98% |

Service Provider Allowable Thresholds

| | 610<br>*Service Provider* | 615<br>*Completion Threshold* | 620<br>*Retry Threshold* | 625<br>*Delivery Threshold* |
|---|---|---|---|---|
| 605a | Insurance Company | No Lower Than 85% | No Higher Than 10% | No Lower Than 91% |
| 605b | Cloud Computing Service | No Lower Than 65% | No Higher Than 31% | No Lower Than 71% |
| 605c | Bank | No Lower Than 92% | No Higher Than 3% | No Lower Than 98% |

*FIG. 6*

AUTOMATED MESSAGE ROUTING CHANGES BASED ON COMPLETION RATE

BACKGROUND

Internet users regularly maintain a variety of accounts with websites, cloud applications, or other online service providers. The service providers typically use traditional username and password checks, as a first layer of security, to authenticate a user before granting access to the services. To improve account security, the service providers may also layer additional factors of authentication before authenticating a user, some of which may be associated with the user's mobile telephone or mobile network account. For example, the service provider may verify that the user is in possession of a mobile telephone associated with the account, based on the successful exchange of a one-time password (OTP) with the mobile telephone, as an additional layer of authentication. By authenticating users through a combination of username and password checks as well as through other information, such as the verified possession of an associated device (the combination commonly referred to as two-factor authentication (2FA) or multi-factor authentication (MFA)), service providers are able to more securely grant account access to only intended users while preventing access by those who have compromised one of the security layers.

Messages used to facilitate 2FA, including messages used during the exchange of OTPs, are routed from a message origin, such as a device sending the message, to a message destination, such as a device receiving the message, over a communication network. When messages are sent over a network, messages can sometimes be lost (e.g., not successfully transmitted) due to various network issues, such as poor connectivity within the network, an outage impacting a portion of the network, network congestion, and other sources of network unreliability. The loss of messages, including messages used during 2FA, can cause a myriad of issues, such as preventing communications between users in a network, preventing access to services provided over the network, causing diminished user experience, and the like.

An existing but incomplete solution to message loss is the use of multiple communication networks associated with different network operators, such that if a first communication network begins to fail, a service provider can utilize a second communication network. However, it can be challenging to identify when the state of a communication network warrants the routing of messages over another communication network. It would therefore be desirable to improve the manner in which the state of a communication network is assessed, with routing decisions being made accordingly.

BRIEF DESCRIPTION OF THE DRAWINGS

FIG. 5 is a schematic illustration of an example data structure for storing network performance metrics maintained by a message routing service, in accordance with representative embodiments of the present technology.

FIG. 6 is a schematic illustration of an example data structure for storing service provider thresholds and criteria, used by a message routing service for network selection, in accordance with representative embodiments of the present technology.

Figure 1:
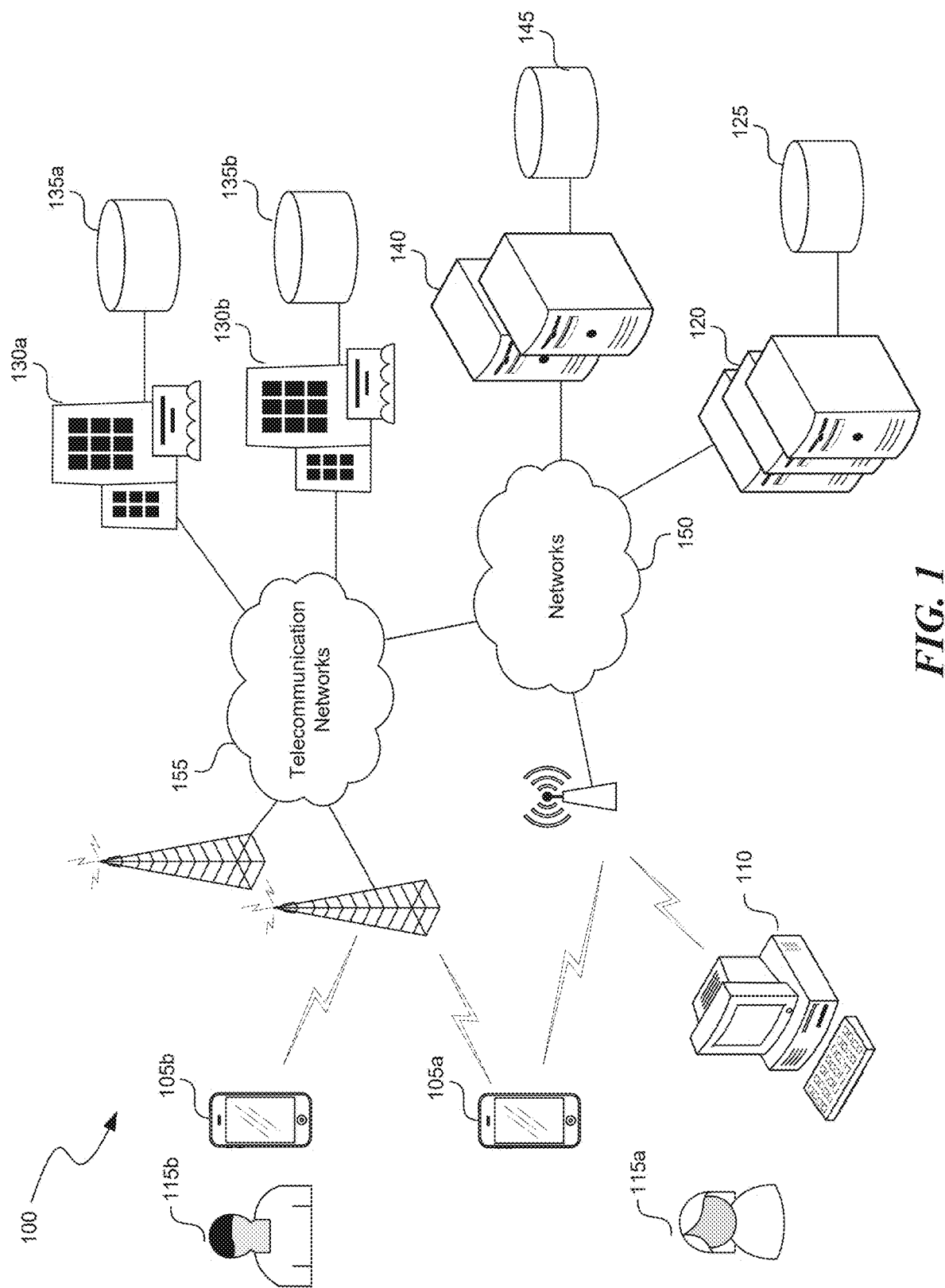
FIG. 1 is a diagram of a representative environment in which a message routing service can operate.

The techniques introduced in this disclosure can be better understood by referring to the following Detailed Description in conjunction with the accompanying drawings.

DETAILED DESCRIPTION

A message routing service designed to improve the routing of messages between service providers and users over communication networks associated with network operators (the "message routing service"), and associated methods, is disclosed herein. The service evaluates the performance of communication networks over which messages are transmitted based on information associated with the transmitted messages (e.g., whether messages were successfully delivered, how many message transmissions were retried, and/or, as described further herein, whether the message recipient successfully completed an action based on the message). Based on the evaluation, and as described herein, the message routing service can utilize other communication networks, which may be associated with other network operators, for the communication of subsequent messages.

The message routing service can evaluate messages transmitted between service providers (e.g., websites, cloud services, mobile applications, online applications, and other network-accessible resources) and end users of the service providers. The evaluated messages can be any of many different types of messages, such as messages communicated between a service provider and an end user to authenticate the user (e.g., as part of a 2FA scheme), including messages used to transmit OTPs to or from an end user. As described herein, the message routing service can determine whether a requested action associated with a message was completed, such as a successful exchange of OTPs between a service provider and an end user. The message routing service can use the "completion rate" of the evaluated messages (e.g., the ratio of OTPs that were successfully exchanged between service providers and end users over a communication network to the total number of OTPs transmitted as part of authentication flows over the communication network), in addition to other metrics, to assess the performance of the communication networks over which the messages were transmitted. As described herein, the additional metrics can be metrics received from an operator of the communication network (e.g., delivery rates) and/or other metrics generated by the message routing service (e.g., retry rates). Based on the evaluation, the message routing service can, in response, adjust message traffic (e.g., messages from service providers to end users) to use other available communication networks.

In some embodiments, the message routing service tracks which communication networks are used for the communication of messages between service providers and users. In some embodiments, the message routing service tracks the destination of the transmitted messages (e.g., the phone number of a user to whom a message is sent). Additionally, the message routing service can track the delivery status of communicated messages, which can be partially indicative of network performance. For example, the message routing service can track whether messages were delivered based on information received from a communication network operator. As a further example, the message routing service can track whether a retry delivery attempt was necessary, which the message routing service may determine based on the transmission of additional messages to a destination within a certain window (e.g., 5 minutes, 15 minutes, etc.) of sending a message to the same destination. The message routing service also determines whether a message has been successfully completed.

In some embodiments of the message routing service, a message is successfully completed if a user performs an action associated with the message. For example, when a message that includes an OTP used for 2FA is sent to a user, the message routing service can treat the message as completed when the user completes the action of returning the correct OTP (e.g., such as when the user enters the correct OTP code into a 2FA software application or at an online service). That is, the user entering the code indicates that the 2FA message was received and then seen by the user. In contrast, and as described herein, other statuses such as delivery confirmation can at times provide a less accurate indicator of successful message communication. For example, some network operators generate delivery confirmation messages before a message is successfully delivered. In another example, if the message is a short message service (SMS) message, the message completion rate can be determined based upon a call to an application programming interface to, for example, respond to the SMS message or open the SMS message. This call to the application programming interface can also generate a confirmation that is sent back to the message routing service that the message has been successfully completed.

As messages are communicated over various communication networks, the message routing service can maintain network performance metrics associated with the different communication networks. For example, the message routing service can evaluate the number of total 2FA messages sent and the number of 2FA messages that were completed (e.g., an OTP successfully returned) to determine a completion rate for messages sent over a particular network. In some embodiments, for example, the completion rate for a particular network is the percentage of the total number of 2FA messages that have been completed in a defined time period, such as in the last fifteen minutes, last hour, last day, last week, last month, last year, and the like. The message routing service can also determine and maintain other rates and network performance metrics associated with each communication network, such as message delivery rate (e.g., the total number of messages that were delivered) and message retry rate (e.g., the total number of messages for which there was a retry attempt). In some embodiments, the message routing service tracks and maintains network performance metrics for each of the communication networks (e.g., the service may track that a first communication network has one completion rate and a second communication network has a different completion rate).

Using the maintained network performance metrics (e.g., completion rates, delivery rates, and/or retry rates), the message routing service can identify when there are indications of problems in communication networks and take action accordingly. For example, when the completion rate associated with a communication network falls below a threshold, the message routing service may use alternative communication networks for transmitting subsequent messages. As a further example, when the completion rate associated with a communication network falls below a threshold, the message routing service may transmit test messages over the communication network to determine whether the drop in completion rate is a temporary condition. In some embodiments, and as described further herein, the message routing service may use different thresholds associated with different service providers. For example, the message routing service can be configured to use a different communication network for a bank once the completion rate for the bank's 2FA messages drops below 92%, but it may use a different threshold for other service providers.

As described herein, the message routing service advantageously uses the completion rates associated with messages (e.g., transmitted as part of a 2FA process) as an indicator of the performance and/or reliability of a communication network, based on which the service can determine whether to continue to transmit messages over the communication network or to route messages over alternative communication networks. In contrast, existing approaches to message routing rely on alternative metrics, such as a decrease in message delivery rate or an increase in message retry rate, to assess the performance of available communication networks. However, these known metrics can suffer from various shortcomings. For example, network operators may provide inflated delivery rate numbers, thereby providing an inaccurate and overly positive characterization of network performance. As a further example, retry rates can be partially reflective of user behaviors (e.g., a user may request a new 2FA code be sent to him or her before a first 2FA code was delivered) and therefore may fluctuate for reasons other than network performance. Similarly, network operators may provide speculative delivery confirmations before a message has actually been delivered.

In other words, the use of message completion rate provides a metric that is more accurate and thereby more representative of actual network performance. While message deliveries and acknowledgements can be faked and/or not be indicative of a user actually performing a requested action, the completion rate shows that a user took a specified action in response to receiving the message, such as entering an OTP or accessing a web link. Because completion rates rely on the performance of such actions, completion rates are a more accurate metric for determining when a network is properly functioning and is not congested.

Though primarily described with reference to evaluating the transmission of messages including OTPs, and whether code exchanges of the OTPs included therein as part of a 2FA process were successfully completed, it will be appreciated that the message routing service can be used to adjust message routes based on other forms of completion. For example, certain telecommunication companies may own a plurality of networks over which SMS, email, video, and other messages are transmitted. The message routing service can be used to select which of the networks owned by the telecommunication company is currently the best network over which to transmit messages. More generally, the message routing service can determine the completion rate of various verifiable user actions performed in response to the user receiving a message, based on which the performance of the network over which the message was routed can be assessed.

Various implementations of the service and methods will now be described. The following description provides specific details for a thorough understanding and an enabling description of these implementations. One skilled in the art will understand, however, that the service and methods may be practiced without many of these details or with alternative approaches. Additionally, some well-known structures or functions may not be shown or described in detail so as to avoid unnecessarily obscuring the relevant description of the various implementations. The terminology used in the description presented below is intended to be interpreted in its broadest reasonable manner, even though it is being used in conjunction with a detailed description of certain specific implementations of the system and methods.

Suitable Environments

FIG. 1 and the following discussion provide a brief, general description of a suitable environment in which a message routing service may be implemented. Although not required, aspects of the service are described in the general context of computer-executable instructions, such as routines executed by a general-purpose computer, a personal computer, a server, or other computing system. The service can also be embodied in a special-purpose computer or data processor that is specifically programmed, configured, or constructed to perform one or more of the computer-executable instructions explained in detail herein. Indeed, the terms "computer" and "computing device," as used generally herein, refer to devices that have a processor and non-transitory memory, like any of the above devices, as well as any data processor or any device capable of communicating with a network. Data processors include programmable general-purpose or special-purpose microprocessors, programmable controllers, application-specific integrated circuits (ASICs), programming logic devices (PLDs), or the like, or a combination of such devices. Computer-executable instructions may be stored in memory, such as random-access memory (RAM), read-only memory (ROM), flash memory, or the like, or a combination of such components. Computer-executable instructions may also be stored in one or more storage devices, such as magnetic or optical-based discs, flash memory devices, or any other type of non-volatile storage medium or non-transitory medium for data. Computer-executable instructions may include one or more program modules, which include routines, programs, objects, components, data structures, and so on that perform particular tasks or implement particular abstract data types.

Aspects of the service can also be practiced in distributed computing environments, where tasks or modules are performed by remote processing devices, which are linked through a communications network, such as a Local Area Network (LAN), Wide Area Network (WAN), or the Internet. In a distributed computing environment, program modules or subroutines may be located in both local and remote memory storage devices. Aspects of the service may be provided electronically over the Internet or over other networks (including wireless networks). Those skilled in the relevant art will recognize that portions of the service may reside on a server computer, while corresponding portions may reside on a client computer.

FIG. 1 illustrates an example environment 100 in which a message routing service operates. The environment may include mobile communication devices 105a and 105b, and personal computing device 110, each of which may be used by users 115a and 115b to access third-party server computers 120. The third-party server computers 120 may host or be associated with one or more network-accessible resources, such as websites, cloud services, online applications, or other online resources offered by a service provider. The users 115a-b may access the third-party server computers 120 to, for example, register a new account with a service provider, access an existing account with a service provider, complete a transaction through a website, etc. The third-party server computers 120 may utilize data storage area 125, which maintains information about users of the service provider, including a username, a password, and a telephone number associated with the user (such as a telephone number corresponding to mobile communication devices 105a or 105b). Although FIG. 1 illustrates two users and two mobile communication devices, the computing environment 100 can include any number of users and devices (e.g., millions or billions).

To improve security, service providers may attempt to use data in addition to a username and password to verify users 115a and 115b in connection with a registration, login, or other access of third-party server computers 120. For example, the service providers may attempt to verify that users 115a and 115b are in possession of corresponding mobile communication devices 105a and 105b as an additional layer of authentication in conjunction with the registration, login, or access processes. One way service providers can authenticate that users are in possession of a device is to send a message to the user to request that the user perform an action, such as entering an OTP into a software application or accessing a particular secured web page. Messages may be transmitted over communication networks maintained and/or operated by mobile network operators 130a and 130b.

The message routing service disclosed herein may in part reside on server computers 140, and it selects a communication network over which messages are routed between computing systems, servers, and/or mobile communication devices, such as third-party server computers 120, server computers 140, mobile communication devices 105a and 105b, and other various components in the environment 100. In some embodiments, the message routing selects the communication network over which 2FA messages and other messages are routed, including messages that include an OTP for a user (e.g., transmitted to mobile communication devices 105a or 105b) and/or messages that include an OTP response (e.g., transmitted to third-party server computers 120, server computers 140, and/or other components that can additionally be used in an authentication flow). In some embodiments, third-party server computers 120, or server computers 140 on behalf of the third-party service, can generate and transmit a 2FA message to a user device, such as mobile communication devices 105 and/or 105b. In another example, user 115b may send a message, such as an SMS message or a 2FA message, to a destination in the environment 100, such as third-party server computers 120 or other mobile communication devices in the environment 100.

The message routing service can track messages in the environment 100, measure statistics about the communication of messages within the environment 100, and the like. For example, the server computers 140 may identify a mobile communication device that has sent a message and determine whether the message was successfully delivered to an intended destination computing device, such as a second mobile communication device or a server computer. That is, the message routing service can determine what percentage of sent messages were delivered and therefore determine a delivery rate. As a further example, after a message has been transmitted to a user (e.g., to mobile communication devices 105a or 105b) the server computers 140 track whether an expected action associated with the message, such as the opening of a hyperlink, the input of a particular code in a software application or web page, and/or a message response from the user (e.g., with a matching OTP) has occurred. If the expected action has occurred, the server computers 140 mark the message as successfully completed. The message routing service can also track whether users perform an incorrect action in response to receiving the message, such as entering an incorrect code, or can track when no action is performed in response to receiving the message, such as user inaction or message timeout in the environment 100.

The data storage area 145 can be used by the message routing service to track outstanding messages (e.g., the message destination, the communication network over which the message was transmitted, etc.), maintain and update message completion rates associated with different networks and/or service providers, evaluate different performance thresholds for networks and/or service providers before rerouting is performed, and the like.

The mobile communication devices 105a and 105b, personal computing device 110, third-party server computers 120, mobile network operators 130a and 130b, and server computers 140 communicate with each other through one or more public or private, wired or wireless networks 150 and 155, including, for example, the Internet and telecommunication networks. The mobile communication devices 105a and 105b communicate wirelessly with a base station or access point using a wireless mobile telephone standard, such as the Global Service for Mobile Communications (GSM), Long Term Evolution (LTE), IEEE 802.11, or another wireless standard, and the base station or access point communicates with the third-party server computers 120, mobile network operators 130a and 130b, and server computers 140 via the network 150. Personal computing device 110 communicates through the network 150 using, for example, TCP/IP protocols. The mobile communication devices 105a and 105b additionally communicate wirelessly with the telecommunication network 155 using, for example, nearby cell towers or base stations using wireless mobile telephone standards, such as GSM, Code Division Multiple Access (CDMA), General Packet Radio Service (GPRS), and the like. The network 150 and telecommunication network 155 may be interconnected such that, for example, mobile communication devices 105a and 105b connected to the telecommunication network 155 can communicate via the network 150 with the third-party server computers 120, mobile network operators 130a and 130b, server computers 140, and other devices connected to the network. The mobile communication devices 105a and 105b utilize applications or other software, which operate through the use of computer-executable instructions. Some such applications may be directed toward tracking and routing messages. As will be described in more detail herein, the message routing service residing at least in part on the server computers 140 may also utilize software that operates through the use of computer-executable instructions as part of a tracking and routing process.

While FIG. 1 illustrates a single network 150 and telecommunication network 155, it will be appreciated that the devices of the environment 100 (e.g., communication devices 105a and 105b, personal computing device 110, third-party server computers 120, mobile network operators 130a and 130b, and server computers 140) can communicate over multiple networks 150 and 155, each of which can be operated, managed, deployed, and the like by different network operators. In these implementations, the message routing service can select one or more of the networks to use to communicate messages, such as selecting a network based on operating parameters and/or performance thresholds (e.g., measured completion rates compared to a completion rate threshold).

As described herein, the server computers 140, using data 145, can identify when messages transmitted by a third party, such as 2FA messages sent by third-party server computers 120, are sent, completed, and/or not completed. Additionally, the server computers 140 can generate additional metrics, such as completion rate (e.g., the percentage of successfully completed OTP code exchanges over a communication network out of the total number of OTP code exchanges attempted over the communication network). Based on these metrics, as well as other performance characteristics, the server computers 140 can evaluate whether to transmit future messages over the same or a different communication network.

Suitable Service

Figure 2:
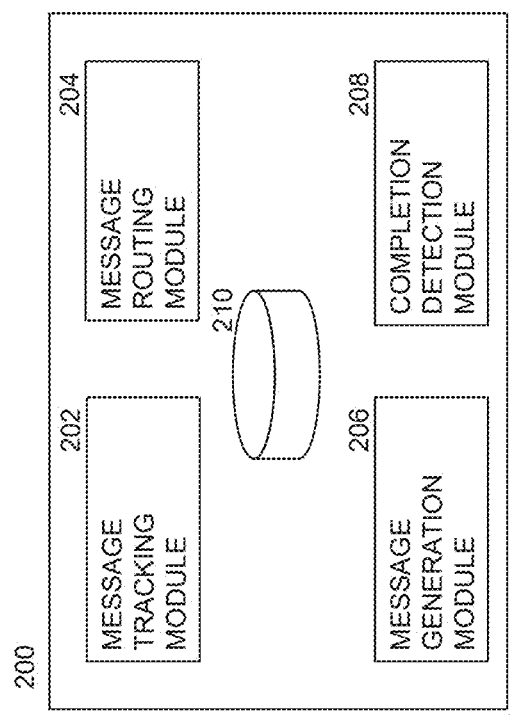
FIG. 2 is a block diagram illustrating a message routing service, in accordance with representative embodiments of the present technology.

FIG. 2 is a block diagram illustrating modules forming a message routing service 200. Aspects of the service may be practiced on computing devices operated by end users, computing devices operated by messaging entities, computing devices operated by service providers (e.g., entities or services utilizing or providing messaging services to users), computing devices operated by mobile network operators, or a combination thereof.

A message tracking module 202 tracks messages as the messages communicate through networks. The message tracking module 202 can assign a unique identifier to each message that passes through the monitored network(s). The unique identifier can be a unique identification number, a unique identification name, a unique identification code, and the like. In some implementations, the unique identifier can be immutable, such as being a unique hash code or string identifying the message.

The message tracking module 202 can generate and/or gather network performance metrics about messages passing through the monitored network(s). Network performance metrics associated with each network can be identified based on a network identifier associated with the communicated messages. For example, the message tracking module 202 can receive data from message origin devices or message destination devices, the data including information regarding which network was used to transmit the message. As a further example, when the message routing service 200 transmits a message (described further herein), it can track the network over which the message is sent.

The message tracking module 202 can receive status information from various sources, based on which it can generate network performance metrics. For example, the message tracking module can receive an indication from an origin device when the origin device sends a message through a network (e.g., indicating a message transmission). In another example, message destination devices can indicate to the message tracking module when a message has been received (e.g., indicating a message delivery). In a still further example, message destination devices can indicate when an action has been taken regarding the message, such as opening the message, responding to the message, accessing a link in the message, using a code sent in the message to authenticate a user, and the like. As an additional example, the message tracking module can receive information from a communication network when a message delivery needed to be retried.

In order to generate network performance metrics, such as completion rate, for messages in the network(s), the message tracking module 202 can receive and/or determine message completion statuses associated with each message passing through the network(s). For example, when a user takes an action to complete a message, such as entering an OTP or accessing a web link from a message, the message tracking module 202 can receive an indication that the action has been performed. Based on this indication (or on lack of an indication that a message has been completed), the message tracking module 202 can determine message completion rates for messages sent over a particular network. In another example, a message generation module 206 (as described below) can generate an OTP in a message. The message generation module 206 can provide the OTP to the message tracking module 202. When the user associated with the message destination device responds with an OTP, the message tracking module 202 receives the responsive OTP and compares the received OTP to the generated OTP. If the received OTP and the generated OTP match, the user can be authenticated and the message tracking module 202 determines that the message was completed. The message tracking module 202 can then update a completion rate associated with the network and/or service provider used to send the message.

A message routing module 204 selects a network from available networks over which to transmit one or more messages. In some implementations, the message routing module 204 can route messages through various networks and/or for different service providers based on various criteria. For each service provider, the message routing service (e.g., message routing module 204) can maintain shared criteria or individual criteria for determining how to evaluate the performance of communication networks used to route messages for those service providers and determining whether an alternative communication network should be utilized. For example, the message routing module 204 can have a default set of criteria for every service provider, such as default retry rates, default completion rates, and/or default viewed message rate thresholds, that can be used to select networks to route messages through. In another example, individual service providers can have specific criteria for routing messages originating from customers of the service provider, such as specific retry rates, specific completion rates, and/or specific viewed message rate thresholds.

As described herein, the criteria can be various thresholds that must be satisfied by a communication network over which messages are transmitted, which if not met can cause the message routing service to take certain actions (e.g., route future messages over a different communication network). For example, the message routing module 204 can evaluate the completion rate associated with 2FA messages transmitted over a communication network (determined, for example, by the message tracking module 202) and compare the completion rate to a threshold (e.g., associated with a service provider). If the completion rate is below the threshold, the message routing module 204 can take an action associated with the communication network. For example, the message routing module 204 can then select an alternative communication network over which to transmit messages. As a further example, the message routing module 204 and/or message generation module 206 can generate test messages for further data collection of the communication network.

In some implementations, different criteria can be shared by different service providers, such as by one or more service providers that communicate with their end users over one or more communication networks using the message routing service. In other implementations, particular service providers can be associated with different criteria. For example, one service provider may require that a communication network have a 95% message completion rate if messages associated with the service provider are to be transmitted over the communication network. If this message completion rate is not met, the message routing module 204 can take certain actions, such as routing messages through a different communication network. The message routing module 204 can also respond to a failing criteria by sending one or more test messages over the communication network.

In some embodiments, the message routing module 204 can use other network performance metrics in addition to completion rate to evaluate communication network performance. For some service providers, completion rates can be used in conjunction with other network performance metrics, such as delivery rates or retry rates, to determine which network will be used to send a message to a user device.

The message generation module 206 can generate different message types that are sent over the various networks associated with service providers. For example, the message generation module 206 can generate SMS messages, 2FA messages, OTP messages, and/or other kinds of messages that can be sent over the various networks associated with service providers in the environment. The message generation module 206 can specify various parameters of the message during message generation, such as the message destination, the service provider network to use to send the message, the 2FA OTP to be included in the message, and the like.

A completion detection module 208 can detect when an action associated with message completion is performed. For example, the completion detection module 208 can compare an OTP transmitted to the user with a responsive OTP code received from the user to determine whether the user received the correct OTP code and responded with the correct OTP code. If the user inputs the correct code, the completion detection module 208 detects that the message has been completed. In another example, if the message included a URL or hyperlink for the user to access, the completion detection module 208 can detect when the user accesses the URL or hyperlink to determine that the message has been completed. In a further example, the completion detection module 208 can detect that the user called a phone number provided to them in the message to determine that the message has been completed.

The message tracking module 202, message routing module 204, message generation module 206, and completion detection module 208 can access and store data to storage area 210, such as network performance metrics related to message completion rate and message transmittal through monitored networks. The data storage area 210 can also store information related to individual messages, such as message origin and message destination. The stored data may be stored in any readily accessible format, including data maintained by a database management system or in any relational, non-relational, object, or other database. The stored data can include stored completion rates associated with different networks or service providers. Additional details can be found below in relation to FIG. 5.

Flows for a Message Routing Service

Figure 3:
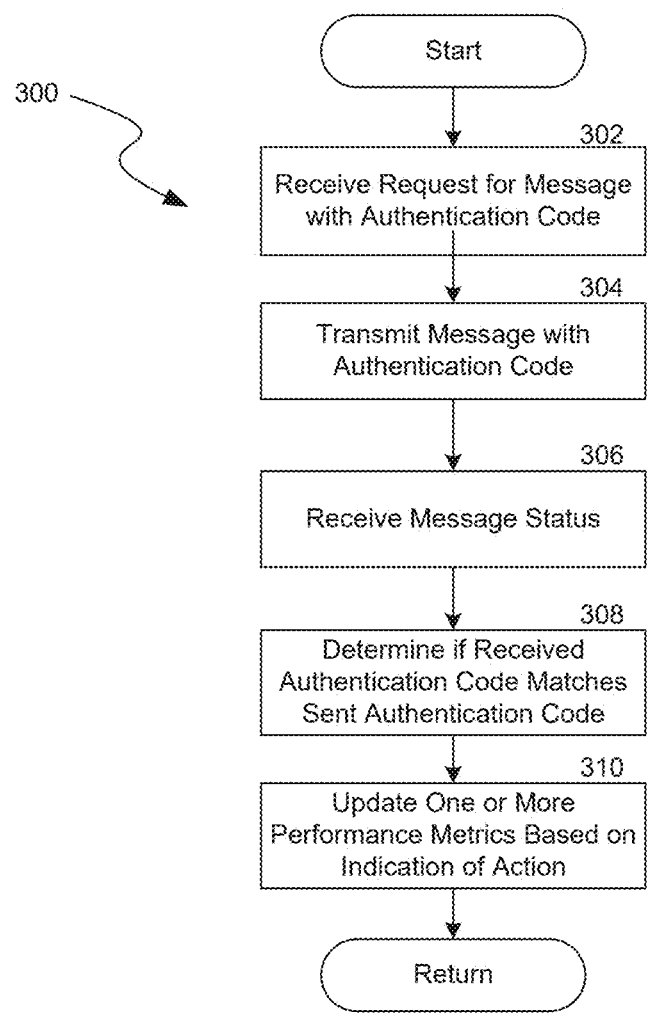
FIG. 3 is a flow diagram illustrating a process implemented by a message routing service for generating network performance metrics based on message tracking, in accordance with representative embodiments of the present technology.
Figure 4:
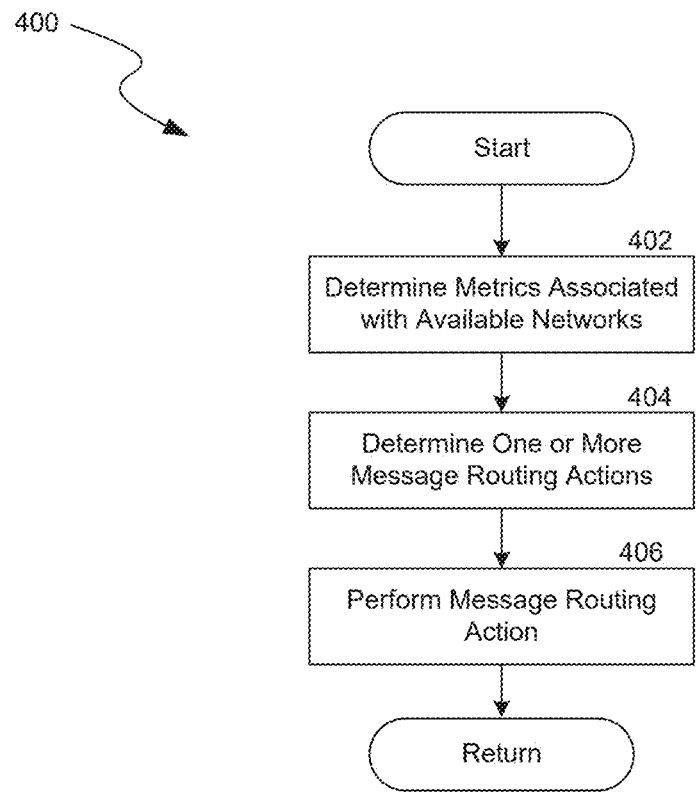
FIG. 4 is a flow diagram illustrating a process implemented by a message routing service for evaluating network performance metrics, characterizing the performance of communication networks, to perform one or more message routing actions, in accordance with representative embodiments of the present technology.

FIGS. 3-4 are flow diagrams illustrating example processes 300 and 400, respectively, implemented by a message routing service for tracking and routing messages in a communication network.

FIG. 3 illustrates generally a process 300 for generating network performance metrics based on message tracking, used in some embodiments of a message routing service.

The process 300 can, in some embodiments, begin in response to one or more messages being created, received, determined to be completed, and/or other actions associated with messages being transmitted in the network. In other embodiments, the process 300 can run continually and monitor message transmissions in one or more networks.

At block 302, process 300 receives a request for a message with an authentication code. For example, the request can be received from a service provider, where the message is intended to be used to authenticate a user of the service provider. The authentication code can be an OTP, such as an alphabetical, numerical, and/or an alphanumerical code, a hyperlink or URL, or a phone number. The authentication allows the receiver of the message at the message destination (e.g., the user of the service provider) to perform an action to authenticate their identity, such as entering the authentication code into a software application or web page, accessing the hyperlink or URL, or calling the phone number.

In some implementations, the request includes a message destination phone number or other form of contact information, such as an email address, that can be used to identify a destination for the message. In further implementations, the request can also include the authentication code to be sent in the message to the message destination. In other implementations, the service generates an authentication code to be included in the message.

In some implementations, the request can also include custom text for the message, such as a prompt to access a software application to input the authentication code, a prompt to select the hyperlink or URL, a prompt to call the provided phone number, and the like.

At block 304, process 300 generates a message including the authentication code and transmits the message to the message destination. The message can include the authentication code generated by the service or provided by the service provider, default prompt text or the custom text provided by the service provider, and other information, such as a time limit specifying how long the authentication code will be valid and a help link. The message is then transmitted to an identified message destination, such as a message destination phone number provided by the service provider. As described herein, the message can be transmitted over any of several different communication networks (e.g., different communication networks, maintained by different network operators, over which the message routing service is capable of transmitting messages). The transmission of messages over any of several communication networks is described further below, in relation to FIG. 4.

At block 306, process 300 receives a status of a message. In some embodiments, the status of the message can be an indication that the message has been delivered, sent, and the like. In some embodiments, the status of the message can be an indication of an action being performed that is associated with the transmitted message. For example, the service provider associated with the message request may detect the performance of an action associated with the transmitted message, such as a user entering an OTP into a software application or web page, a user calling a phone number, or a user accessing a web page using a hyperlink or URL, and indicate to the message routing service the performance of the action and outcome. In another example, the service provider can generate a notification or application programming interface (API) call that informs process 300 that an action has been performed, the type of action performed, the action outcome, a user and/or authentication code associated with the action, the network over which the initial message was transmitted, and/or other information about the action, such as timestamp of action, length of time between sending of message and action performed, and the like. In some embodiments, process 300 detects the action directly, such as receiving an OTP from a user, receiving an access request for a web page, or receiving a phone call for the user. Process 300 can also determine information about the action, such as the authentication code associated with the action, the user associated with the action, the network associated with the action, the type of action performed, and the like. In some implementations, information received by process 300 can include a transaction ID, which uniquely identifies the message, the user, the authentication code, and other information related to the message.

At block 308, process 300 determines whether the authentication code from the indication of the action matches the transmitted authentication code. In some implementations, the service provider provides the indication that the authentication code from the indication of the action matches the transmitted authentication code. In other implementations, process 300 receives the indication that the action has been performed and then determines whether there is a code match. For example, process 300 can receive an authentication code and compare the received authentication code to the transmitted authentication code. In some embodiments, the transmitted authentication code is an OTP generated by the message routing service or a service provider. In another example, process 300 can receive an access request from a URL included in an authentication message. In response to receiving the authentication request, process 300 determines that the action has been performed.

At block 310, process 300 updates one or more network performance metrics based on the received indication of the action. For example, if the authentication code from the indication of the action matches the transmitted authentication code, process 300 can update a completion rate associated with the network used to transmit the message to show that the message was successfully completed, update a completion rate associated with a service provider who owns the network to show the message was successfully completed, and the like. Process 300 can further transmit a notification to the service provider indicating that the authentication code matches, which allows the service provider to authenticate the user.

If the authentication code from the indication of the action does not match the transmitted code, process 300 can still update one or more network performance metrics associated with the service provider and/or the network used to transmit the message. For example, process 300 can update a completion rate to reflect that the message was not completed. As a further example, the process 300 can update a delivery rate to reflect whether or not the message was delivered, based for example on status received from a communication network operator (e.g., at block 306). As a still further example, the process 300 can update a retry rate to reflect whether or not the transmitted message is a retransmission of a previously transmitted message (based, for example, on detecting that the messages were sent to same destination within a certain window of time, such as 15 minutes). In some implementations, process 300 also sends a notification to the service provider indicating that the authentication code does not match, which allows the service provider to deny authentication of the user, retry authentication of the user, attempt to deliver the message to the user again, and the like.

These network performance metrics can then be used to make routing decisions for future messages, as described below with regards to FIG. 4. The statistics can be saved in a memory, such as in a table as illustrated in FIG. 5.

FIG. 4 illustrates a process 400 for evaluating network performance metrics, characterizing the performance of communication networks, to perform one or more message routing actions, used in some embodiments of a message routing service. In some embodiments, process 400 is performed in response to a message being generated, such as by the message routing service (e.g., at block 304 of process 300 as illustrated in FIG. 3). In some embodiments, process 400 is performed periodically and/or continuously to evaluate communication networks.

At block 402, process 400 determines one or more network performance metrics associated with one or more networks over which messages can be transmitted. As discussed above with regards to block 310 of FIG. 3, network performance metrics, such as completion rate, retry rate, delivery rate, and other network performance metrics, can be determined for various networks over which messages can be transmitted and maintained by the message routing service. A message routing service can track these network performance metrics over time and maintain the network performance metrics for the various networks, such as keeping the network performance metrics updated in a database. Process 400 can then access these network performance metrics when needed (e.g., when transmitting a message).

At block 404, process 400 determines one or more message routing actions based on the network performance metrics. In some embodiments, the message routing action can be the selection of the network over which to transmit messages, based on an evaluation of the networks' corresponding network performance metrics. For example, process 400 can determine, based on network performance metrics, whether to transmit messages over a particular network, not transmit messages over the particular network, and/or take other actions (e.g., transmit test messages to further assess the performance of the network). In some embodiments, the selection of a network is based on one or more criteria associated with a service provider that has requested to send a message. For example, a service provider can require that a network have a message completion rate greater than 90% for messages associated with the service provider (e.g., messages used in 2FA authentication or other messages) to be sent over the network. Process 400 can identify which networks have a current completion rate over 90% and then select a network with a completion rate over 90% for transmission of the message. In further embodiments, additional criteria can be used to select the network, such as using a combination of completion rate, delivery rate, and retry rate to select a network. After process 400 selects the network, the message is transmitted over the selected network.

In some embodiments, the message routing action can include other actions, instead of or in addition to the selection of a new network over which to transmit messages, when the process 400 determines that a network's metrics do not meet one or more criteria. For example, based on network performance metrics, the process 400 can determine to send test messages over a network. The test messages can be useful to generate additional data about a network and update the associated network performance metrics accordingly. In some embodiments, the completion rate of a network may be high enough to continue sending messages over the network, but low enough to trigger the sending of test messages. In some embodiments, the process 400 may use test messages when there is a sudden change in completion rate. For example, if a network has been operating consistently at a 90% completion rate and the message routing service suddenly detects a 50% completion rate over the network during a narrow window of time, the process 400 may send a test message over the network to obtain additional information about the network. In some embodiments, the process 400 may generate test messages based on a combination of one or more of the following criteria: completion rate, retry rate, and delivery rate. For example, the process 400 may generate a test message for a network when the network's completion rate remains steady but the delivery rate has dropped and/or retry rate has increased.

At block 406, process 400 performs the selected actions. For example, process 400 can begin using the selected network for transmitting future messages (e.g., systemwide or for a particular service provider). As a further example, process 400 can transmit test messages to further test the network.

FIG. 5 is a schematic illustration of an example data structure 500 for storing network performance metrics, such as may be generated and maintained by a message routing service. As described herein, as messages are transmitted over various networks, the message routing service can monitor the status of those messages and, based on those statuses, can generate metrics indicative of network performance. The data structure 500 is made up of network performance records 505a, 505b, 505c, and so on, where each network performance record 505a-n is associated with a specific communication network. As illustrated, each network performance record 505a-n includes a network identifier 510, such as a network name or other unique identifier of a network with which the record is associated. The network performance records 505a-n additionally include various network performance metrics that characterize the performance of the corresponding network. For example, as illustrated, the network performance records 505a-n can include completion rates 515, retry rates 520, and delivery rates 525 for the corresponding networks. In some embodiments, additional metrics can be maintained in the data structure 500, such as user response rate (e.g., whether the user responded to the message, regardless of whether or not the response was correct).

FIG. 6 is a schematic illustration of an example data structure 600 for storing service provider thresholds and criteria used by a message routing service to determine message routing actions (e.g., selecting a network over which to transmit messages). The data structure 600 is made up of provider criteria records 605a, 605b, 605c, and so on, where each provider criteria record 605a-n is associated with a specific provider. As illustrated, each provider criteria record 605a-n includes a service provider identifier 610, such as a service provider name or other unique identifier of the service provider with which the record is associated (e.g., a record for an insurance provider, a record for a bank, etc.). The provider criteria records 605a-n additionally include criteria, set by and/or associated with the corresponding provider, that shall be satisfied by a communication network if the network is to be used for the communication of messages associated with the provider. For example, as illustrated, provider criteria records 605a-n can include completion threshold 615, retry threshold 620, and delivery threshold 625. As described herein, a message routing service can use the thresholds to make decisions regarding the routing of messages associated with a provider, where different service providers can have different thresholds and criteria for network selection. For example, a bank may have higher requirements of a network (e.g., better completion rate, better delivery rate, lower retry rate) than a cloud computing service, because the bank is authorizing financial transactions, while the cloud computing service may only be verifying an identity of a user to log into the service. In some embodiments, the data structure 600 can include a provider criteria record corresponding to default criteria, where the thresholds for the default criteria record can be set by a user of a message routing service (e.g., an administrator) and used as a default if a service provider has not specified certain thresholds.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the disclosed technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative combinations or subcombinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples: alternative implementations may employ differing values or ranges.

These and other changes can be made to the disclosed technology in light of the above Detailed Description. While the above description describes certain examples of the disclosed technology, and describes the best mode contemplated, no matter how detailed the above appears in text, the disclosed technology can be practiced in many ways. Details of the service and methods may vary considerably in their specific implementations, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. In general, the terms used in the following claims should not be construed to limit the disclosed technology to the specific examples disclosed in the specification, unless the above Detailed Description section explicitly defines such terms.

We claim:

1. A computer-implemented method of selecting a communication network over which to route a message, the method comprising:
    maintaining, at a computing system, a plurality of completion rates, wherein each completion rate is associated with a communication network from a plurality of communication networks and each completion rate characterizes a ratio of (1) a total number of successful user authentications for a plurality of users over the associated communication network to (2) a total number of user authentication attempts for the plurality of users over the associated communication network;
    receiving, from a service provider, a request to authenticate an end user of the service provider;
    generating an authentication message;
    selecting, based on the maintained completion rates, a communication network from the plurality of communication networks;
    transmitting the authentication message to a device associated with the end user using the selected communication network;
    receiving an indication that the end user performed an action in response to receiving the authentication message;
    determining whether the end user has been authenticated based on the end user action; and
    updating the maintained completion rate associated with the selected communication network based on the determination of whether the end user has been authenticated based on the end user action.

2. The method of claim 1, wherein the authentication message includes a first authentication code, and wherein the action associated with the authentication message is a user response that includes a second authentication code.

3. The method of claim 2, wherein the end user is authenticated when the first authentication code matches the second authentication code.

4. The method of claim 2, wherein the first authentication code is a one-time password (OTP).

5. The method of claim 1, wherein the authentication message includes a hyperlink to a website, and wherein the end user is authenticated when it is detected that the website was accessed using the hyperlink.

6. The method of claim 1, wherein the selection of the selected communication network is further based on a message retry rate or a message completion rate associated with the selected communication network.

7. The method of claim 6, wherein the message retry rate or the message completion rate is generated for the selected communication network based on a received status associated with the selected communication network.

8. The method of claim 1, further comprising transmitting a test message a communication network associated with a completion rate of the plurality of completion rates when the completion rate is below a threshold value.

9. The computer-implemented method of claim 1, wherein the completion rate associated with the selected communication network increases when it was determined the end user has been authenticated.

10. A computer-readable medium comprising a set of instructions that, when executed by one or more processors, cause the one or more processors to perform a process, the process comprising:
    maintaining, at a computing system, a plurality of completion rates, wherein each completion rate is associated with a communication network from a plurality of communication networks and each completion rate characterizes a ratio of (1) a total number of successful user authentications for a plurality of users over the associated communication network to (2) a total number of user authentication attempts for the plurality of users over the associated communication network;
    receiving, from a service provider, a request to authenticate an end user of the service provider;
    generating an authentication message;
    selecting, based on the maintained completion rates, a communication network from the plurality of communication networks;

transmitting the authentication message to a device associated with the end user using the selected communication network;

receiving an indication that the end user performed an action in response to receiving the authentication message;

determining whether the end user has been authenticated based on the end user action; and updating the maintained completion rate associated with the selected communication network based on the determination of whether the end user has been authenticated based on the end user action.

11. The computer-readable medium of claim 10, wherein the authentication message includes a first authentication code, and wherein the action performed in response to receiving the authentication message is a user response that includes a second authentication code.

12. The computer-readable medium of claim 11, wherein the end user is authenticated when the first authentication code matches the second authentication code.

13. The computer-readable medium of claim 11, wherein the first authentication code is a one-time password (OTP).

14. The computer-readable medium of claim 10, wherein the authentication message includes a hyperlink to a website, and wherein the end user is authenticated when it is detected that the website was accessed using the hyperlink.

15. The computer-readable medium of claim 10, wherein the selection of the selected communication network is further based on a message retry rate or a message completion rate associated with the selected communication network.

16. The computer-readable medium of claim 15, wherein the message retry rate or the message completion rate is generated for the selected communication network based on a received status associated with the selected communication network.

17. The computer-readable medium of claim 10, the process further comprising transmitting a test message to a communication network associated with a completion rate of the plurality of completion rates when the completion rate is below a threshold value.

18. The computer-readable medium of claim 10, wherein the completion rate associated with the selected communication network increases when it was determined the end user has been authenticated.

19. A computing system comprising:
one or more processors; and
a memory comprising a set of instructions that, when executed by the one or more processors, cause the one or more processors to perform a process, the process comprising:
maintaining, at a computing system, a plurality of completion rates, wherein each completion rate is associated with a communication network from a plurality of communication networks and each completion rate characterizes a ratio of (1) a total number of successful user authentications for a plurality of users over the associated communication network to (2) a total number of user authentication attempts for the plurality of users over the associated communication network;
receiving, from a service provider, a request to authenticate an end user of the service provider;
generating an authentication message;
selecting, based on the maintained completion rates, a communication network from the plurality of communication networks;
transmitting the authentication message to a device associated with the end user using the selected communication network;
receiving an indication that the end user performed an action in response to receiving the authentication message;
determining whether the end user has been authenticated based on the end user action; and
updating the maintained completion rate associated with the selected communication network based on the determination of whether the end user has been authenticated based on the end user action.

20. The computing system of claim 19, wherein the authentication message includes a first authentication code, and wherein the action performed in response to receiving the authentication message is a user response that includes a second authentication code.

* * * * *